United States Patent [19]

Crorey et al.

[11] Patent Number: 5,492,443
[45] Date of Patent: Feb. 20, 1996

[54] APPARATUS FOR HANDLING A WORKPIECE BETWEEN WORK STATIONS

[75] Inventors: David J. Crorey, Utica, Mich.; Leland D. Blatt, 21 Carrington Pl., Grosse Pointe Farms, Mich. 48236

[73] Assignee: Leland D. Blatt, Grosse Pointe Farms, Mich.

[21] Appl. No.: 136,586

[22] Filed: Oct. 14, 1993

[51] Int. Cl.$^6$ .................................................. B25J 9/04
[52] U.S. Cl. ...................... 414/744.5; 212/224; 212/319; 901/15; 901/21
[58] Field of Search .................... 414/744.3, 744.5, 414/718, 729; 212/213, 223, 224, 232, 245; 901/21, 15, 28

[56] References Cited

U.S. PATENT DOCUMENTS

| | | |
|---|---|---|
| 3,401,568 | 9/1968 | Blatt . |
| 3,546,956 | 12/1970 | Blatt . |
| 4,226,568 | 10/1980 | Christian . |
| 4,299,533 | 11/1981 | Ohnaka . |
| 4,370,091 | 1/1983 | Gagliardi . |
| 4,392,776 | 7/1983 | Shum . |
| 4,507,046 | 3/1985 | Sugimoto et al. . |
| 4,921,395 | 5/1990 | Sahlin . |
| 5,017,083 | 5/1991 | Sahlin . |
| 5,039,274 | 8/1991 | Bennison ..................... 414/744.5 |

*Primary Examiner*—Donald W. Underwood
*Attorney, Agent, or Firm*—Basile and Hanlon

[57] ABSTRACT

An apparatus for automatically handling a workpiece between automated workstations wherein the workpiece is lifted from an unloading workstation, moved along a predetermined linear reciprocal path between work stations while simultaneously inverting the workpiece, and lowering the workpiece into a loading workstation. The apparatus provides a vertical lift portion and an articulating portion for manipulating the workpiece. The vertical lift portion utilizes a compact design to minimize space requirements and moving parts by providing both vertical movement and rotational movement within a common structure. The articulating portion is attached to the bottom of the vertical lift portion and provides a pivot arm that is pivotally attached to a workpiece holder. The vertical lift portion provides a rotational input to a harmonic drive unit which has its output coupled to the pivot arm. When the pivot arm rotates, a continuous timing belt provides for counter-rotational movement of the workpiece holder. The workpiece is detachably secured by the workpiece holder, and when the pivot arm and the workpiece holder are equivalent in length, the workpiece will travel in a linear path while also inverting the orientation of the workpiece upon completing the linear path. The range of movement of the workpiece may also be extended by mounting the apparatus on an overhead gantry which moves the entire apparatus, along with the workpiece, further along the linear path. A linear drive unit may also by utilized as a workpiece holder to provide an extended reach to the workpiece along the linear path.

14 Claims, 5 Drawing Sheets

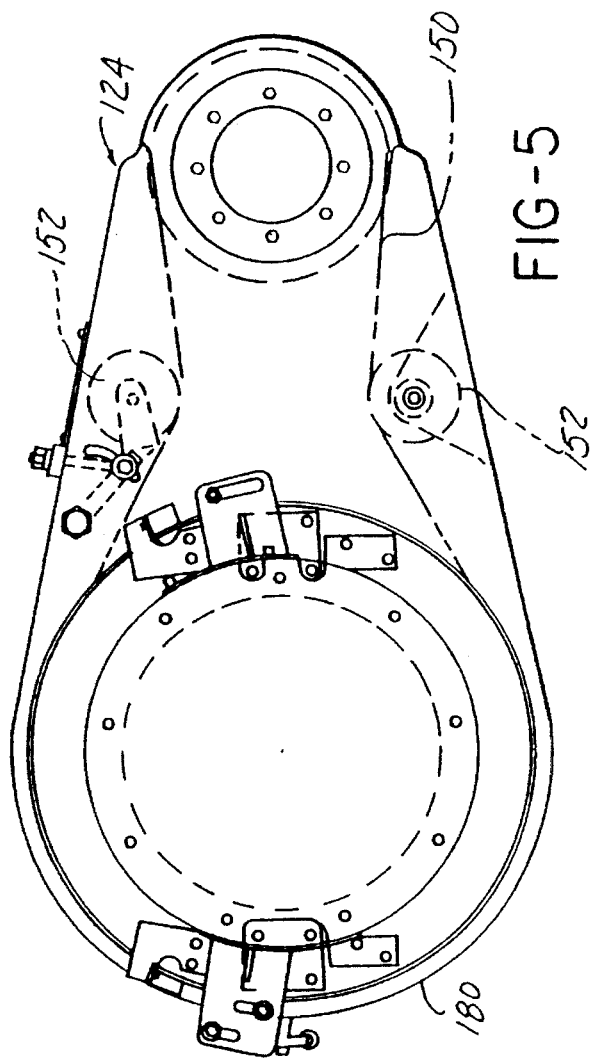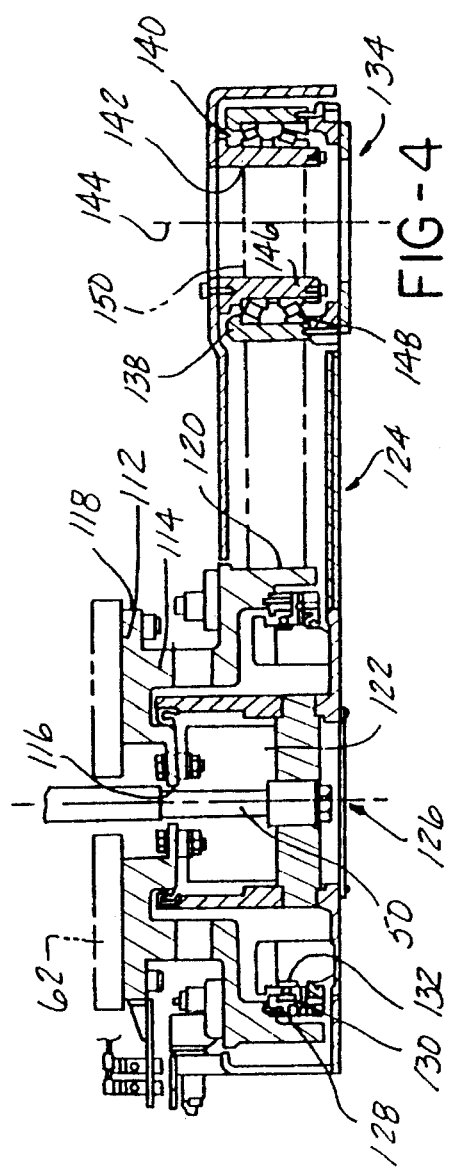

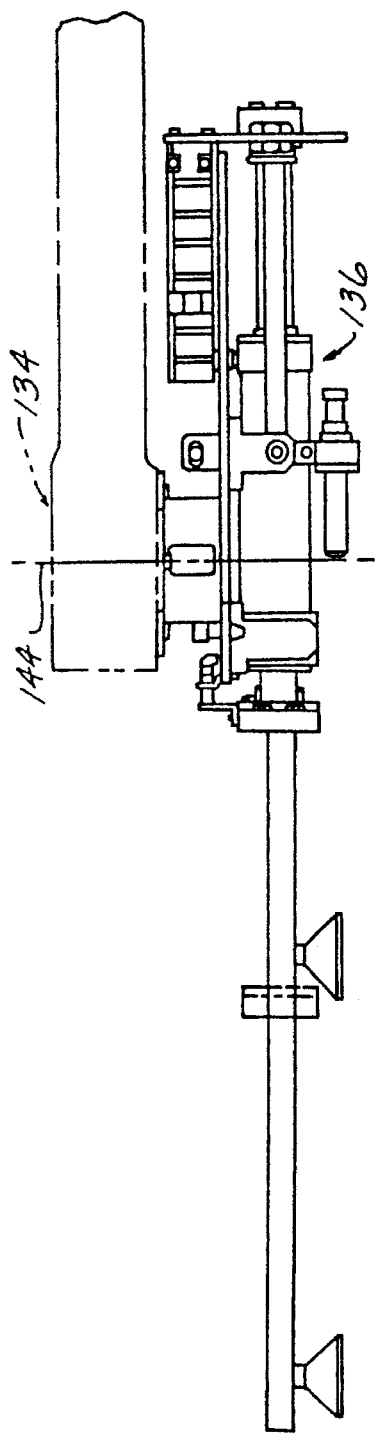
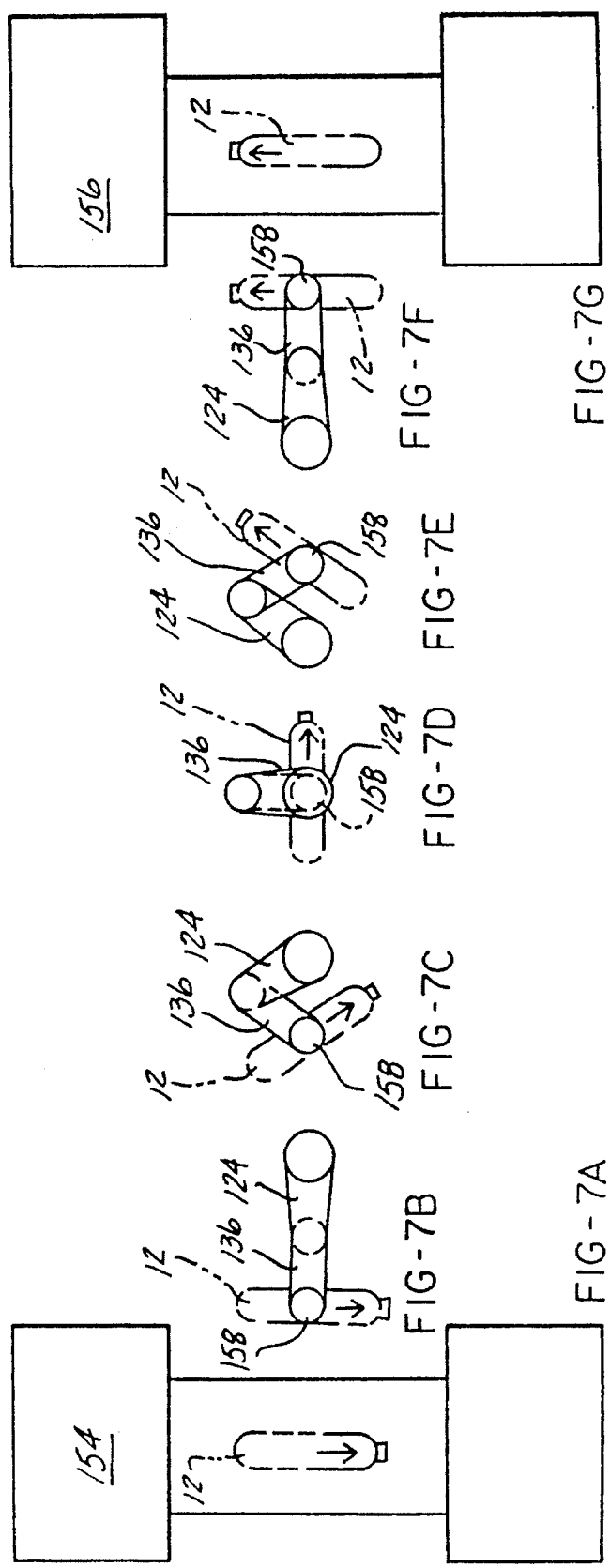

APPARATUS FOR HANDLING A WORKPIECE BETWEEN WORK STATIONS

FIELD OF THE INVENTION

The present invention relates to the automated handling of workpieces between automated workstations and more particularly, to an apparatus which automatically lifts a workpiece from an unloading workstation, moves the workpiece along a predetermined linear reciprocal path while simultaneously inverting the workpiece, and lowers the workpiece into a loading workstation.

BACKGROUND OF THE INVENTION

The technological advancement of automated workstations has led to a need for automated handling systems to automatically transfer workpieces between automated workstations. Most of these automated handling systems are rather simple in that they have a limited range and a limited degree of freedom, but others may be large and complex to suit a particular application, thus requiring a vast amount of space and moving parts. Such systems breed inefficiencies in industrial production in that limited degrees of movement and freedom inhibit flexibility, large space requirements require more plant space, and too many moving parts require a high level of maintenance.

It would be desirable to provide a versatile apparatus that would automatically raise a workpiece from an automated workstation, harmonically move the workpiece in a linear reciprocal path between automated workstations while simultaneously inverting the orientation of the workpiece, and lower the workpiece into an automated receiving workstation. It would also be desirable for an apparatus to provide several degrees of freedom by utilizing a compact design and a limited number of moving parts and to provide harmonic movement of the workpiece so that the workpiece accelerates at the start of travel and decelerates at the end of travel in order to limit the amount of time in which work is not being conducted on the workpiece.

SUMMARY OF THE INVENTION

The present invention provides an apparatus for automatically moving a workpiece along a predetermined linear reciprocal path between automated workstations while simultaneously inverting the orientation of the workpiece, and raising and lowering the workpiece upon loading and unloading the automated workstations. A vertical lift portion of the apparatus provides a carriage that slidably engages a frame of the apparatus and provides vertical movement of the workpiece. An articulating portion of the apparatus provides a pivot arm that is pivotally attached to the bottom of the carriage and extends outward in a horizontal plane. A workpiece holder is pivotally attached to the extending end of the pivot arm and extends outward in a horizontal plane. The workpiece holder provides a means for detachably securing a workpiece. Both the pivot arm and the workpiece holder rotate simultaneously and counter-rotationally so that the workpiece travels in a linear reciprocal path between workstations. While traveling the linear path, the orientation of the workpiece is inverted to accommodate the fixturing of the automated workstation.

The workpiece is directed in a linear path between automated workstations to reduce the amount of time in which the workpiece is out of a workstation. Harmonic motion of the workpiece allows the workpiece to accelerate from its start of travel and decelerate at the end of travel so that the amount of time the workpiece is outside of a workstation is minimized. The workpiece also travels underneath the apparatus so that a limited amount of space is required of both the apparatus and the workpiece. The vertical lift portion provides both vertical and rotational movement in a compact design while utilizing a limited number of moving parts.

In the preferred form, the present invention includes a vertical lift portion for providing vertical movement to the workpiece and an articulating portion for moving the workpiece in a predetermined linear reciprocal path. The vertical lift portion provides a carriage that slidably engages guide rails of a frame. A motor is utilized to power the carriage vertically along the guide rails. A telescopic shaft extends vertically through the carriage and into a gear connection housed in a bottom portion of the carriage. The telescopic design of the shaft provides for vertical adjustment of the shaft upon vertical movement of the carrier and for rotation of the entire shaft when driven by a second motor.

The articulating portion of the apparatus lies below the vertical lift portion and provides a pivot arm that is pivotally connected to the bottom of the carriage. The pivot arm extends outward in a horizontal plane and provides a rotatable supporting means for supporting a workpiece holder below the pivot arm. The workpiece holder extends outward in a horizontal plane and detachably secures the workpiece. An output of the gear connection is connected to the pivot arm so that when the telescopic shaft rotates, a step-down gear ratio provided in the gear connection rotates the pivot arm at a smaller rotational velocity than the driveshaft. A sprocket is provided in the rotatable supporting means of the workpiece holder, and a timing belt extends continuously around the sprocket and the carriage. Thus, when the pivot arm rotates, the timing belt rotates the workpiece holder counter-rotationally to the pivot arm. When the distance from the first pivot axis to the second pivot axis is the same distance as the second pivot axis to the centerline of the workpiece, then the centerline of the workpiece travels along a linear path below the carriage. The workpiece will also rotate 180° to an inverted position with respect to its starting orientation.

In another form, a counterbalance is used to offset the load realized by the vertical lift portion of the apparatus. A piston cylinder is provided within the carriage and is coaxial with the telescopic shaft. A piston slides vertically along the area defined by the piston cylinder and the output shaft. A bottom support means helps to define a pressurized chamber with the aid of the piston cylinder, the piston and a piston rod. The piston rod is connected to the piston and extends coaxially downward to a bottom portion of the carriage. By maintaining the volume of air in the chamber, a constant air pressure is maintained in the chamber, thereby counter-balancing the load realized by the carriage and reducing the load on the vertical drive motor.

In yet another form, a conventional harmonic drive unit is utilized for the gear connection. The harmonic drive unit receives an input from the output shaft and provides an output that is connected to the pivot arm. Harmonic motion of the workpiece is provided so that the velocity of the workpiece accelerates from the beginning to the middle of its linear path and decelerates from the middle to the end of its linear path.

In even another form, a conventional splined nut screw is utilized to couple a driveshaft portion and an output portion of the telescopic shaft so that the telescopic shaft can provide both vertical adjustment and rotational movement of the driveshaft to the output shaft. A splined nut screw is connected to the top portion of the output shaft, and the driveshaft provides a circumferential spline which mates with the inside of the spline nut screw and the output shaft. The output shaft is free to telescopically slide along the driveshaft while also having the spline nut screw engage the circumferential spline of the driveshaft to provide rotation upon the driveshaft rotating.

In an additional form, linear movement may be expanded by adding an additional degree of freedom to the apparatus. An overhead gantry unit may be utilized to support the frame of the apparatus and provide for further linear movement of the entire apparatus along the length of the gantry. This in turn provides a greater range of linear movement of the workpiece. The workpiece holder may also comprise a conventional linear transfer unit to extend the linear path of the workpiece so that the workpiece may be placed in or taken out of a confined area.

To this end, the object of the present invention is to provide a new and improved apparatus for automatically handling a workpiece between automated workstations so that the workpiece travels in a predetermined linear reciprocal path while simultaneously being inverted along the path and providing vertical movement of the workpiece for loading and unloading the workpiece into and out of a workstation.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 4 is a sectional view showing the pivot arm.

FIG. 5 is a top view of the pivot arm.

FIG. 6 is a side elevation view of a linear drive module being utilized as a workpiece holder.

FIGS. 7A–G are schematics showing the movement and position of the articulating portions of the present invention during the movement of the workpiece.

DESCRIPTION OF THE PREFERRED EMBODIMENT

Figure 1:
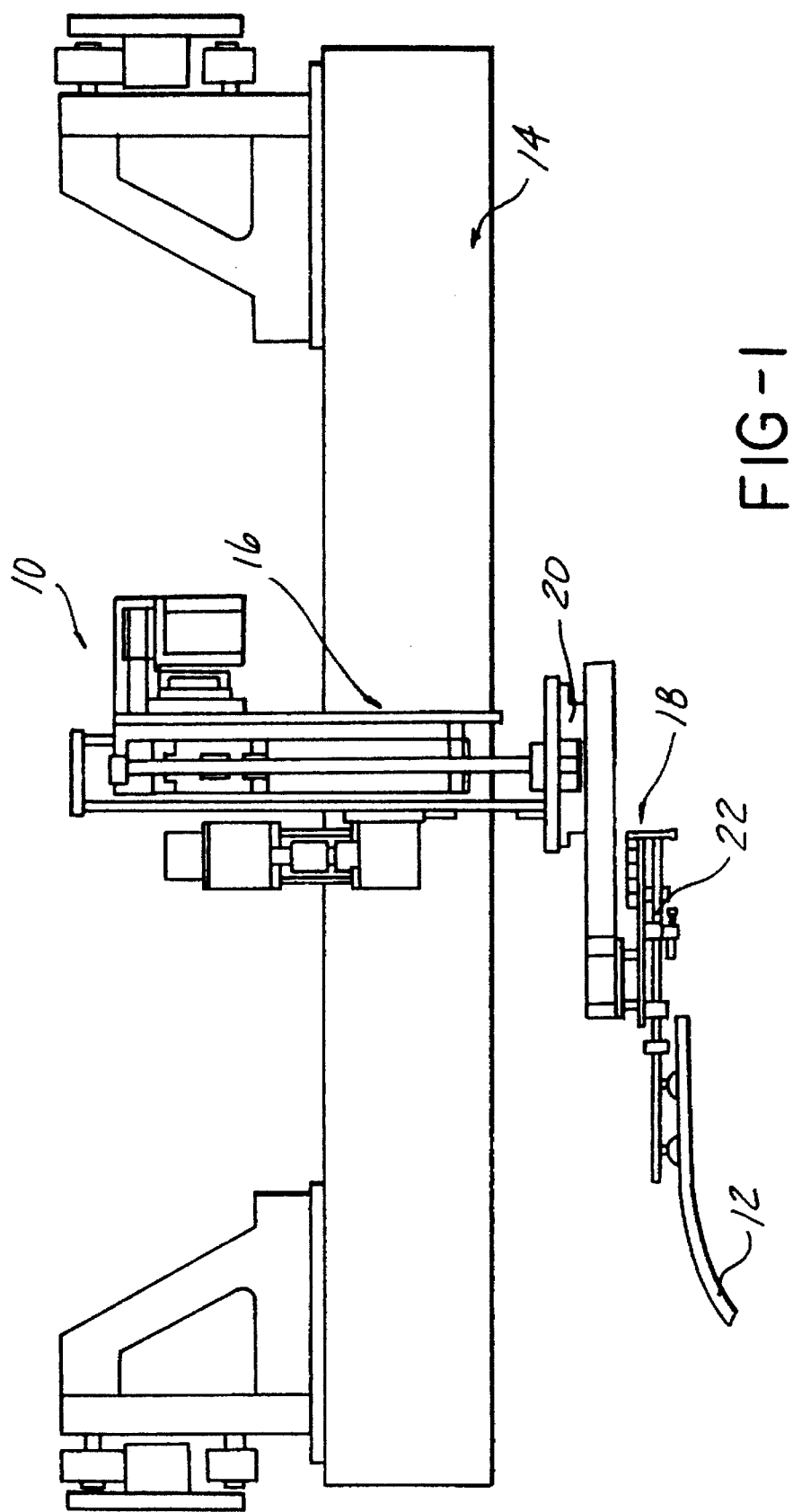
FIG. 1 is a side elevation view of the present invention mounted to an overhead gantry.

Referring to the drawings, the present invention will now be described in detail with reference to the preferred embodiment.

FIG. 1 shows the present invention in a typical application whereby the apparatus 10 is utilized to automatically unload and load a workpiece 12 from one automated workstation (not shown) to a subsequent automated workstation (not shown). The apparatus 10 is connected to an overhead gantry 14 so as to move the entire apparatus 10 in a linear horizontal direction, thereby providing a greater range of linear movement for the workpiece 12. The apparatus 10 has a vertical lift portion 16 to provide vertical movement of the workpiece 12 for lifting and lowering the workpiece 12 from and into the workstations. An articulating portion 18 of the apparatus 10 is connected to a bottom 20 of the vertical lift portion 16 and provides movement of the workpiece 12 in a horizontal linear reciprocal path while simultaneously inverting the orientation of the workpiece 12 180° during the linear path. A linear drive unit 22 may be utilized to extend or retract the workpiece 12 to or from an enclosed area.

Figure 2:
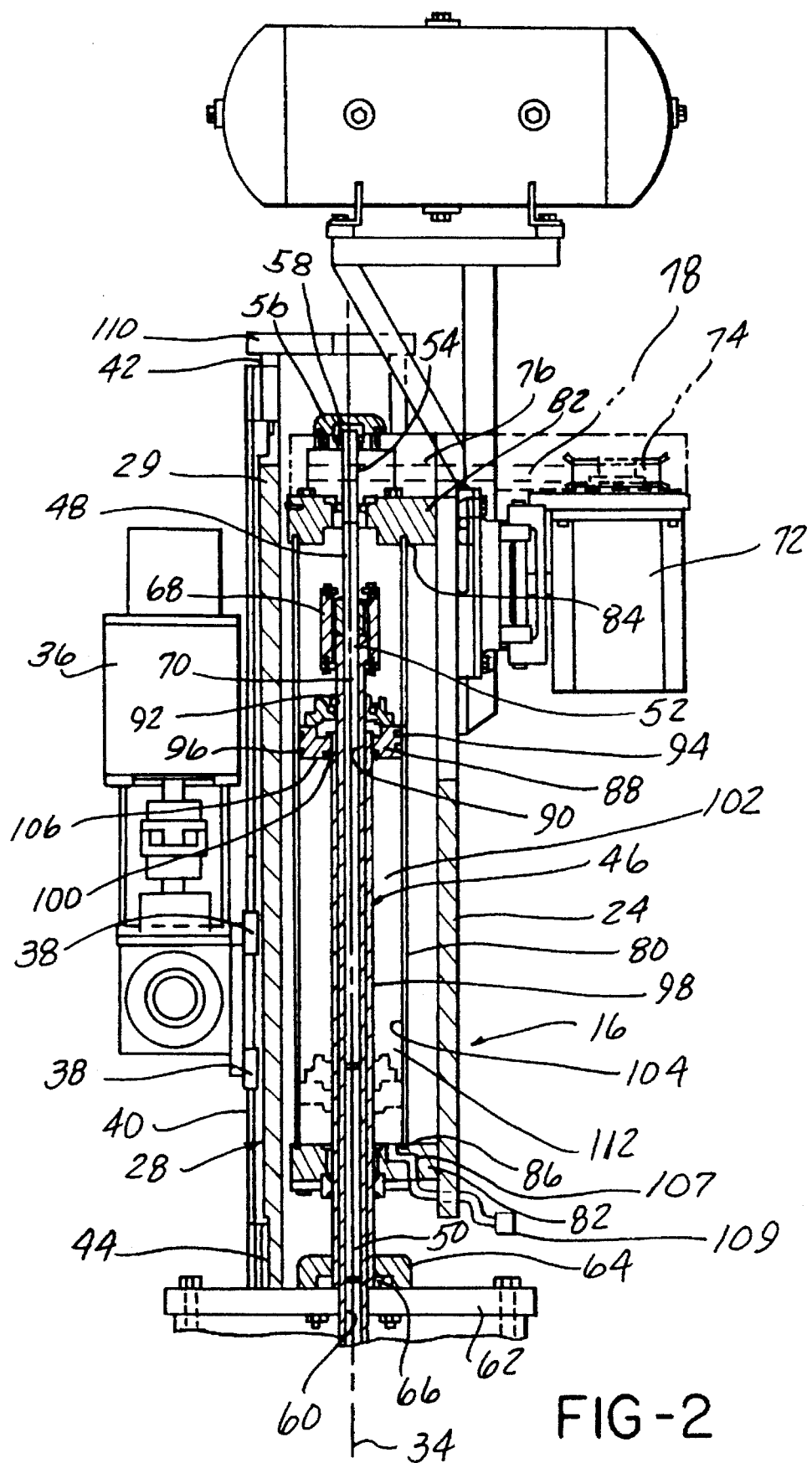
FIG. 2 is a cross-section of the vertical lift portion of the apparatus.
Figure 3:
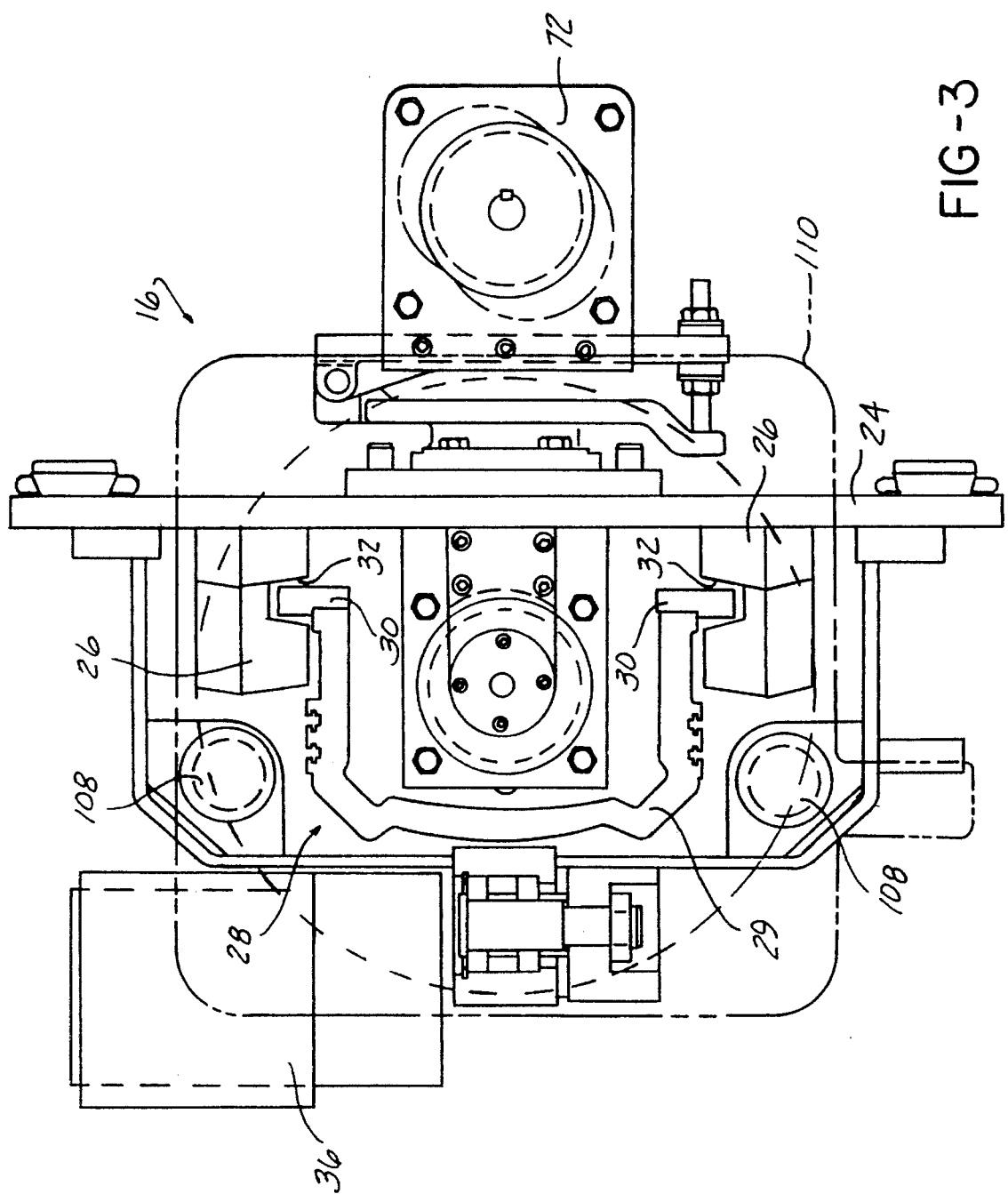
FIG. 3 is a top view of the vertical lift portion of the present invention.

To reduce the size and the number of parts in the apparatus 10, the vertical lift portion 16 provides two degrees of movement within a common compact design. The vertical lift portion 16 of the apparatus 10 provides both vertical movement and rotational movement within the same structure. As seen in FIGS. 2 and 3, the vertical lift portion 16 comprises a frame 24 that is typically mounted to an overhead structure, such as the gantry 14, so that the area below the apparatus 10 is fully accessible. A pair of parallel guide rails 26 are connected to the frame 24 and extend vertically downward along the full length of the frame 24. A carriage 28 extends downwardly and has a u-shaped portion 29 that provides rollers 30 on each of its ends. The rollers 30 are supported in tracks 32 of the guide rails 26 and allow for the carriage 28 to roll or slide vertically along the guide rails 26. The carriage 28 has a vertical axis that defines a first pivot axis 34, and the first pivot axis 34 remains vertical by having the guide rails 26 prohibit angular movement of the carriage 28 relative to the first pivot axis 34.

To power vertical movement of the carriage 28 along the guide rails 26, a motor 36 and a series of pulleys 38 are utilized to lift and lower the carriage 28. The motor 36 is attached to the frame 24 and a series of three staggered pulleys 38 extend outward from the motor 34. A continuous timing belt 40 is connected to a top portion 42 of the u-shaped portion 29 of the carriage 28, and the timing belt 40 is weaved through the series of pulleys 38 and connected to a bottom portion 44 of the u-shaped portion 29 of the carriage 28. The motor 36 drives the pulleys 38 which in turn feed the timing belt 40 through the pulleys 38 to provide for the raising and lowering of the carriage 28 in a vertical direction.

To provide rotational movement to the horizontal articulating portion 18 that manipulates the workpiece 12, a telescopic shaft 46 is housed within the carriage 28 and extends coaxially downward along said first pivot axis 34, as seen in FIG. 2. The telescopic shaft 46 has a driveshaft 48 that provides the top portion of the telescopic shaft 46, and an output shaft 50 overlying the driveshaft 48 that provides the bottom portion of the telescopic shaft 46. The driveshaft 48 is a solid cylinder having circumferential splined gear teeth 52 that slide telescopically within the hollow cylinder of the output shaft 50. The top portion 54 of the driveshaft 48 is supported to the frame 24 by a bearing support 56 and a bearing 58 which allow the driveshaft 48 to rotate while also prohibiting angular movement of the driveshaft 48 relative to the first pivot axis 34. The output shaft 50 extends downward through a corresponding aperture 60 provided in a lower horizontal mounting plate 62 that is connected to the bottom of the u-shaped portion 29 of the carriage 28. A bearing support 64 and bearing 66 provide rotational support of the output shaft 50 while prohibiting angular movement of the output shaft 50 relative to the first pivot axis 34.

In order for the telescopic shaft 46 to provide both rotational movement as well as telescopic movement, a conventional spline nut screw 68 is attached to the upper portion 70 of the output shaft 50. The spline nut screw 68 extends upward from the output shaft 50 and engages the splines 52 of the driveshaft 48. The spline nut screw 68 provides vertical telescopic movement of the output shaft 50 over the splined driveshaft 40 while also engaging the splines 52 to provide rotation of the output shaft 50 upon the driveshaft 40 rotating.

To power the rotation of the driveshaft 48, a second motor 72 is connected to the frame 24 and provides a pulley 74 extending upward from the second motor 72. A similar pulley 76 is connected coaxially to the top portion 54 of the driveshaft 48. A continuous timing belt 78 wraps around the pulley 74 extending from the motor 72 and continues to wrap around the pulley 76 connected to the driveshaft 48. The motor 72 rotates the pulley 74 extending therefrom and drives the timing belt 78 which in turn drives the driveshaft pulley 76, thus causing the driveshaft 48 to rotate the output shaft 50.

The load realized by the vertical lift motor 36 is too large for the motor 36 to operate efficiently and reliably, and therefore, a counter-balancing method is utilized so that the vertical lift motor 36 only realizes the load of the workpiece 12. This allows the motor 36 to be smaller in size due to the much smaller load being applied to the motor 36. As seen in FIG. 2, the counter-balancing portion has a piston cylinder 80 extending vertically downward and coaxially with the first pivot axis 34, and the piston cylinder 80 is housed within the u-shaped portion 29 of the carriage 28. The piston cylinder 80 provides a hollow cylinder encasing a portion of the telescopic shaft 46 and having a pair of mounting brackets 82 that connect each end 84, 86 of the piston cylinder 80 to the frame 24, so that the piston cylinder 80 is prevented from angular movement relative to the first pivot axis 34. A piston 88 rides within the piston cylinder 80 and provides an aperture 90 that is coaxial with the first pivot axis 34, so that the output shaft 50 extends therethrough. A bearing 92 is provided on the inner diameter of the piston 88 so that the piston 88 slides freely along the output shaft 50. A seal 94 and wear ring 96 on the outside diameter of the piston 88 allow the piston 88 to slide freely along the piston cylinder 80 while maintaining a seal 94 between the piston cylinder 80 and the piston 88. A piston rod 98 has a hollow cylinder attached to the bottom of the piston 88 and extending vertically downward and coaxial with the first pivot axis 34. The piston rod 98 overlaps said output shaft 50 and is connected to the top of the lower mounting plate 62. An o-ring 100 is provided between the piston 88 and the piston rod 98 to maintain a seal between the piston rod 98 and the piston cylinder 80.

A pressurized piston chamber 102 is provided in the piston cylinder 80 and is defined by the inside surface 104 of the piston cylinder 80, a bottom surface 106 of the piston 88, the outside surface of the piston rod 98 and the top surface of bottom support 82 of the piston cylinder 80. The bottom support 82 provides a passage way 107 for communication between an outside pressurized air source (not shown) and the pressurized piston chamber 102. The volume of air is maintained in the pressurized piston chamber 102 to provide a constant level of pressure in the piston chamber 102 and against the bottom surface 106 of the piston 88. Ideally, the pressurized piston chamber 102 is pressurized to a level equivalent to the load realized on the lower mounting plate 62. This calibration is done without including the workpiece 12 in the load so that the vertical lift motor 36 only realizes the load of the workpiece 12.

Upon vertical movement of the carriage 28, the piston rod 98 moves with the carriage 28 and in turn, move the piston 88 in a vertical direction. In accordance, as the piston 88 moves downward with the carriage 28, the amount of space in the pressurized piston chamber 102 decreases, thus, air must be released to maintain a constant level of air pressure within the chamber 102. Also, as the piston 88 moves upward with the carriage 28, the amount of space in the pressurized piston chamber 102 increases, and more air must be supplied to provide the same level of air pressure within the pressurized piston chamber 102.

Because of the load applied to the carriage 28, it is desirable to provide a pair of shock absorbers 108 at the limits of the vertical movement range so that stoppage of the carriage 28 at the limits of its travel range will not be abrupt. As seen in FIG. 3 but not shown in FIG. 2, one pair of shock absorbers 108 are mounted parallel on an upper portion of the frame 24, and another pair of shock absorbers (not shown) are mounted parallel on the bottom portion of the frame 24. An upper horizontal mounting plate 110 is attached to the top of the u-shaped portion 29 of the carriage 28 and engages the upper pair of shock absorbers 108 when the carriage 28 has reached the lower vertical limit of its vertical movement range. The lower mounting plate 62 also engages the bottom pair of shock absorbers when the carrier 28 has reached the upper limit of its vertical range of motion in a fashion similar to the upper mounting plate 110 engaging the upper pair of shock absorbers 108.

To supply rotational movement to the horizontal articulating portion 18 of the apparatus 10 and drive the articulating portion 18 into moving the workpiece 12, the output shaft 50 extends vertically downward to engage the articulation portion 18. As seen in FIG. 4, a center pivot portion 114 of the carrier 28 is attached to the bottom 112 of the lower horizontal mounting plate 62. The center pivot portion 114 is coaxial with the first pivot axis 34 and provides an aperture 116 for allowing the output shaft 50 to extend therethrough. The center pivot portion 114 has a stepped cylinder design whereby the top portion 118 of the center pivot portion 114 has a smaller diameter than the lower portion 120. A conventional harmonic drive unit 122 is housed within the lower, large portion 120 of the center pivot portion 114 and is coaxially aligned with the first pivot axis 34. The harmonic drive unit 122 receives the output shaft 50 in the top of the harmonic drive unit 122 as an input to the gear reduction. The harmonic drive unit 122 is utilized to provide an 80:1 gear reduction, so that eighty revolutions of the output shaft 50 will provide one revolution of output.

The harmonic drive unit 122 provides harmonic motion of the workpiece 12 wherein velocity of the workpiece 12 accelerates from the beginning to the middle of its predetermined linear path and decelerates from the middle to the end of the linear path. The harmonic drive unit 122 provides slow movement for the precision movements required in loading and unloading a workstation. The fast movement provided in the middle of the predetermined linear path reduces the amount of time the workpiece 12 is outside a workstation, and therefore, production efficiency is increased.

For the articulating portion 18 to transfer rotational movement of the output shaft 50 into linear movement of the workpiece 12, a pivot arm 124 has a large end 126 that houses and encapsulates the larger, bottom portion 120 of the center pivot portion 114. The bottom of the pivot arm 124 is connected to the output of the harmonic drive unit 122, and therefore receives the gear ratio reduction of the output shaft 50. The center pivot portion 114 is secured to the outer race 128 of a bearing 130, and the pivot arm 124 is secured to the inner race 132 of the bearing 130 so that the pivot arm 124 can pivot about the first pivot axis 34.

As seen in FIGS. 5 and 6, the pivot arm 124 has a small end 134 that extends horizontally outward from the larger end 126 which pivots about the first pivot axis 34. The smaller end 134 of the pivot arm 124 provides a means for rotatably supporting a workpiece holder 136. The rotatable supporting means provides a sprocket 138 and bearing assembly 140 that defines an aperture 142 for receiving the workpiece holder 136. The aperture 142 has a vertical center axis that defines a second pivot axis 144. The circumference of the aperture 142 is defined by a bearing mount 146 surrounded by a bearing 148 and the sprocket 138, respectively. The workpiece holder 136 is fixedly connected to the sprocket 138, and is mounted below the pivot arm 124 to extend outwardly in a horizontal plane.

The workpiece holder 136 may utilize a variety of different structures and functions depending on the structure of the workpiece 12 and the workstations. In the preferred form, the length of the workpiece holder 136, measured by the distance between the second pivot axis 144 and the centerline of the workpiece 12, must be equivalent to the distance between the first pivot axis 34 and the second pivot axis 144 in order for the workpiece 12 to travel in a linear path directly under the carriage 28.

To coordinate movement between the pivot arm 124 and the workpiece holder 136, and to provide linear movement of the workpiece 12, a continuous timing belt 150 extends circumferentially around the larger bottom portion 120 of the center pivot portion 114 and around the sprocket 138 of the rotatable supporting means provided for the workpiece holder 136, as seen in FIGS. 5 and 6. When the pivot arm 124 is rotated by the harmonic drive unit 122, the sprocket 138 of the rotatable support for the workpiece holder 136 travels around the stationary timing belt 150 and rotates the workpiece holder 136 and workpiece 12 counter-rotationally to the pivot arm 124. The workpiece 12 is held rigid in the workpiece holder 136 so that their orientations remain common throughout the linear path of movement. A pair of idle rollers 152 are provides in the pivot arm to remove any unnecessary slack in the timing belt 150.

The present invention is typically utilized to load and unload workstations in an automated, reliable and efficient manner. The present invention would typically serve two workstations 154, 156 by having the present invention 10 placed between the two workstations 154, 156, as seen in FIG. 7A–G. The pivot arm 124 and the workpiece holder 136 begin in an extended horizontal position, as seen in FIG. 7B, and the workpiece holder 136 engages the workpiece 12 in the workstation 154. As mentioned earlier, the workpiece holder 136 may utilize a linear drive unit which would allow the workpiece holder 136 to extend outward in a horizontal plane so as to reach for the workpiece 12 when loading or unloading the workstation 154, as seen in FIGS. 7A and 7G. Also mentioned earlier was the combined use of the present invention 10 with an overhead gantry 14 which provides the workpiece holder 136 with added linear movement by linearly moving the entire apparatus 10.

Once the workpiece holder 136 engages the workpiece 12 in the workstation 154, as seen in FIG. 7A, the vertical lift portion 16 of the apparatus 10 raises the carriage 28 vertically upward to lift the workpiece 12 from the workstation's workpiece fixture (not shown). The second motor 72 rotates the driveshaft 48 which in turn rotates the output shaft 50 to provide input to the harmonic drive unit 122. The output of the harmonic drive unit 122 rotates the pivot arm 124 and causes the timing belt 150 to rotate the workpiece holder 136 in a counter-rotational direction, as seen in FIG. 7C–7F. Since the pivot arm 124 and the workpiece holder 136 are the same length, the centerline 158 of the workpiece 12 travels in a linear path under the carriage 28 and through the first pivot axis 34, wherein both the workpiece 12 and pivot arm 124 rotate 90°. As the pivot arm 124 continues to rotate, the workpiece holder 136 rotates counter-rotationally under the pivot arm 124 and extends outward until the workpiece holder 136 and the pivot arm 124 are extending horizontally, as seen in FIG. 7G. At this time, both the workpiece 12 and the pivot arm 124 have rotated 180°, but the workpiece 12 is inverted. Rotation of the driveshaft 40 stops, and the vertical lift portion 16 lowers the carriage 28 so that the workpiece 12 is lowered into the fixture of the workstation 156, as seen in FIG. 7G.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for moving and handling a workpiece between workstations comprising:

a frame;

means for supporting said frame;

a carriage extending vertically downward and having a vertical axis defining a first pivot axis;

means for slidably supporting said carriage to said frame so that said vertical axis of said carriage remains vertical by prohibiting angular movement of said carriage relative to said vertical axis, and said slidable supporting means providing linear reciprocal movement of said carriage along said first pivot axis;

means for power operating linear reciprocal movement of said carriage along said slidable supporting means;

a telescopic shaft housed within said carriage and extending coaxially with said first pivot axis, and said telescopic shaft having a driveshaft extending from the upper portion of said carriage and an output shaft extending from the lower portion of said carriage, and said output shaft sliding telescopically and coaxially over said drive shaft;

means for coupling said driveshaft and said output shaft so that said output shaft rotates with said rotating driveshaft, and said coupling means providing telescopic reciprocal linear movement of said output shaft relative to said driveshaft;

means for rotatably supporting said telescopic shaft to said frame so that said telescopic shaft remains vertical and coaxial with said first pivot axis by prohibiting angular movement of said telescopic shaft relative to said first pivot axis;

means for manipulating said workpiece in a predetermined path below said carriage, and said manipulating means being connected to the bottom of said carriage and coupled with said output shaft; and means for power rotating said telescopic shaft, and said telescopic shaft powering said manipulating means to move said workpiece along a predetermined path under said carriage.

2. An apparatus as stated in claim 1 wherein said manipulating means comprises:

a horizontal pivot arm having one of its ends directly under said carriage and its other end extending horizontally outward away from said carriage;

means for pivotally supporting said pivot arm to said carriage wherein said carriage is secured to an outer annular race, and said pivot arm is secured to an inner annular race so that said pivot arm rotates about said first pivot axis below said carriage;

means for rotatably supporting a workpiece holder at said other end of said pivot arm, and said rotatable supporting means having a vertical axis defining a second pivot axis, and said second pivot axis being parallel with said first pivot axis;

said workpiece holder having one of its ends mounted to said rotatable supporting means of said pivot arm, and its other end extending horizontally outward from said second pivot axis and having means for detachably securing said workpiece to said workpiece holder, and said workpiece holder pivoting about said second pivot axis in a horizontal plane below said pivot arm;

means for coordinating movement of said pivot arm and workpiece holder so that said pivot arm rotates about said first pivot axis, and said workpiece holder rotates about said second pivot axis so that said workpiece moves in a predetermined path below said carriage; and means for power operating said coordinating movement means for pivoting said pivot arm about said first pivot axis and for pivoting said workpiece holder about said second pivot axis.

3. An apparatus as stated in claim 1 wherein said means for supporting said frame comprises an overhead gantry that provides additional linear reciprocal movement of said workpiece by providing additional linear reciprocal movement of said apparatus.

4. An apparatus as stated in claim 1 wherein said workpiece holder comprises a linear drive unit providing additional linear reciprocal movement of said workpiece along said horizontal plane of said workpiece holder.

5. An apparatus for moving and handling a workpiece between workstations comprising:

a frame;

means for supporting said frame;

a carriage having a u-shaped portion, a mounting plate and a center pivot portion, and said u-shaped portion extending vertically downward and having a vertical axis defining a first pivot axis;

means for slidably supporting said u-shaped portion of said carriage to said frame so that said vertical axis of said u-shaped portion remains vertical by prohibiting angular movement of said u-shaped portion relative to said vertical axis, and said slidable supporting means providing linear reciprocal movement of said carriage along said first pivot axis;

means for power operating reciprocal linear movement of said carriage along said slidable supporting means;

a telescopic shaft housed within said carriage and extending coaxially with said first pivot axis, and said telescopic shaft having a driveshaft extending from the upper portion of said carriage and an output shaft extending from the lower portion of said carriage, and said output shaft sliding telescopically and coaxially over said drive shaft;

means for coupling said driveshaft and said output shaft so that said output shaft rotates upon said driveshaft rotating, and said coupling means providing telescopic reciprocal linear movement of said output shaft relative to said driveshaft;

means for rotatably supporting said telescopic shaft to said frame so that said telescopic shaft remains vertical and coaxial with said first pivot axis by prohibiting angular movement of said telescopic shaft relative to said first pivot axis;

said mounting plate connected to the bottom of said u-shaped portion of said carriage and extending horizontally so that said mounting plate moves vertically with said u-shaped portion along said first pivot axis, and said mounting plate having a hole that is coaxial with said first pivot axis and has said output shaft extending therethrough;

means for counterbalancing the load on said mounting plate less the load provided by said workpiece;

said center pivot portion connected to the bottom of said mounting plate and extending downward from said mounting plate;

a horizontal pivot arm mounted below said mounting plate and having one of its ends pivotally mounted to said center pivot portion of said carriage and another end extending laterally away from said center pivot portion and having a means for rotatably supporting a workpiece holder;

a gear connection housed in said center pivot portion of said carriage and coupled with said output shaft and said pivot arm to provide pivotal movement of said pivot arm about said first pivot axis upon rotation of said output shaft;

a bearing coaxially aligned with said first pivot axis and having an outer race secured to said center pivot portion of said carriage, and an inner race secured to said pivot arm to provide rotation of said pivot arm about said first pivot axis;

means for power rotating said driveshaft so that said output shaft rotates said gear connection thus rotating said pivot arm about said first pivot axis;

said rotatable support means for said workpiece holder having a vertical axis defining a second pivot axis parallel with said first pivot axis;

a workpiece holder rotatably supported by said rotatable support means at one end of said pivot arm and another end of said workpiece holder extending horizontally outward from said second pivot axis and below said pivot arm to detachably secure said workpiece, and said workpiece holder having a distance from said second pivot axis to said workpiece equal to the distance between said first pivot axis and said second pivot axis to provide linear reciprocal movement of said workpiece in a predetermined path below said carriage; and means for coordinating movement between said pivot arm and said workpiece holder so that said workpiece holder rotates counter-rotationally to said pivot arm so that said workpiece travels in a linear reciprocal path below said carriage.

6. An apparatus as stated in claim 5 wherein said counterbalancing means for said mounting plate load comprises:

a piston cylinder extending coaxially along said first pivot axis and housing a portion of said telescopic shaft;

means for supporting said piston cylinder to said frame so that said piston cylinder remains coaxial with said first pivot axis and is prohibited from angular movement relative to said first pivot axis;

a cylindrical piston housed in said piston cylinder and having an aperture for said output shaft to extend therethrough so that said piston is coaxial with said first pivot axis, and said piston having a bearing slidably engaging said output shaft so that said output shaft rotates relative to said piston, and said piston having a wear ring and a seal secured to the circumference of said piston so that said piston is sealed with said piston cylinder while providing linear reciprocal movement along said first pivot axis;

a piston rod having one of its ends connected to said piston, a mid-portion extending coaxially downward along said first pivot axis, and its other end connected to said mounting plate; and means for maintaining a desired volume of air in said piston cylinder so that a constant air pressure is maintained in said piston cylinder thereby applying pressure to said piston and counterbalancing the load on said mounting plate.

7. An apparatus as stated in claim 5 wherein said means for coupling said driveshaft and said output shaft comprises;

said driveshaft having circumferential splined gear teeth; and a splined nut screw connected to said output shaft and engaging said splined gear teeth on said driveshaft so that said output shaft is provided coaxial linear reciprocal movement along said first pivot axis and rotational movement about said first pivot axis upon said driveshaft rotating.

8. An apparatus as stated in claim 5 wherein said gear connection comprises a harmonic drive unit having said output shaft provide input to said harmonic drive unit and having output of said harmonic drive unit coupled to said pivot arm, and said harmonic drive unit providing harmonic velocity of said workpiece so that the velocity of said workpiece increases from the start to the middle of its predetermined path and decreases from the middle to the end of its predetermined path.

9. An apparatus as stated in claim 5 wherein said means for supporting said frame comprises an overhead gantry that provides additional linear reciprocal movement of said workpiece by providing additional linear reciprocal movement of said apparatus.

10. An apparatus as stated in claim 5 wherein said workpiece holder comprises a linear drive unit providing additional linear reciprocal movement of said workpiece along a horizontal plane of said workpiece holder.

11. An apparatus for moving and handling a workpiece between work stations comprising:

a frame;

means for supporting said frame;

a carriage having a u-shaped portion, a lower mounting plate and a center pivot portion, and said carriage extending vertically downward and having a vertical axis that defines a first pivot axis;

a pair of vertically extending parallel guide rails connected to said frame, and said u-shaped portion of said carriage slidably engaging said guide rails so that said u-shaped portion slides along said guide rails providing vertical linear reciprocal movement of said carriage coaxially along said first pivot axis, and said first pivot axis remaining vertical by prohibiting said carriage from angular movement relative to said first pivot axis;

a first motor connected to said frame and having a series of first pulleys;

a belt connected to opposite ends of said u-shaped portion of said carriage, and said first motor driving said belt through said first pulleys to provide vertical linear reciprocal movement of said carriage along said first pivot axis;

means for limiting vertical movement of said carriage along said first pivot axis;

a telescopic shaft extending coaxially along said first pivot axis and housed in said carriage, and said telescopic shaft having a driveshaft in the upper portion of said carriage and an output shaft in the lower portion of said carriage;

said driveshaft having circumferential splined gear teeth that telescopically slide inside said output shaft, and said output shaft having a splined nut screw connected thereto to engage said splines of said driveshaft so that said output shaft rotates upon rotation of said driveshaft, and said splined nut screw also providing vertical linear reciprocal movement of said output shaft along said first pivot axis;

means for rotatably supporting the upper portion of said driveshaft to said frame so that said driveshaft rotates about said first pivot axis and is prohibited from angular or vertical movement relative to said first pivot axis;

a second motor connected to said frame and having a third pulley extending therefrom;

a second pulley connected to and coaxial with said driveshaft;

a continuous timing belt extending around said second pulley and said third pulley so that upon said second motor driving said second pulley, said third pulley is driven by said timing belt thereby rotating said driveshaft and said output shaft;

said lower mounting plate connected to the bottom of said u-shaped portion of said carriage and extending horizontally so that said lower mounting plate moves vertically with said u-shaped portion, and said mounting plate having a hole coaxially aligned with said first pivot axis and having said output shaft extending therethrough;

a piston cylinder extending coaxially with said first pivot axis and housing a portion of said telescopic shaft;

means for supporting said piston cylinder to said frame so that said piston cylinder remains coaxial with said first pivot axis by prohibiting said piston cylinder from angular or vertical movement relative to said first pivot axis;

a cylindrical piston housed in said piston cylinder and coaxial with said first pivot axis, and said piston having a hole coaxial with said first pivot axis for said output shaft to extend therethrough, and said piston having a bearing that rotatably engages said output shaft so that said output shaft rotates relative to said piston, and said piston slidably engaging said piston cylinder by having a wear ring and a seal secured circumferentially to said piston so that said piston is sealed with said piston cylinder while providing vertical linear reciprocal movement along said first pivot axis;

a piston rod having one end connected to said piston, a mid-portion extending downward and coaxially with said first pivot axis, and another end connected to said lower mounting plate;

a pressurized chamber defined by said piston cylinder, said outside diameter of said piston rod, said piston and said lower supporting means for said piston cylinder;

said lower supporting means for said piston cylinder providing a passage way that is in communication with said pressurized chamber and an outside pressurized air source;

means for adjusting the volume of air in said chamber so that said air pressure remains constant against said piston in said chamber to counterbalance the load on said lower mounting plate thereby providing easy vertical linear reciprocal movement of said carriage along said first pivot axis;

said center pivot portion of said carriage connected to the bottom of said lower mounting plate and extending downward from said mounting plate;

a horizontal pivot arm having one of its ends pivotally mounted below said lower mounting plate of said carriage, and its other end extending laterally away from said center pivot portion and having means for supporting a workpiece holder;

a harmonic drive unit housed in said center pivot portion of said carriage and coupled with said output shaft to provide an input to said harmonic drive unit, and said harmonic drive unit having an output coupled to said pivot arm to provide rotation of said pivot arm;

a bearing having an outer race secured to said center pivot portion and an inner race secured to said pivot arm to provide rotational movement of said pivot arm about said first pivot axis;

said rotatable supporting means for said workpiece holder having an aperture with a vertical axis parallel to said first pivot axis and defining a second pivot axis, and said rotatable supporting means having a sprocket and bearing assembly defining said aperture and providing rotational movement of said workpiece holder about said second pivot axis;

said workpiece holder mounted below said pivot arm with one of its ends mounted to said rotatable supporting means of said pivot arm, and another end of said workpiece holder detachably securing said workpiece, and said workpiece holder having a length such that the distance from said second pivot axis to said center of said workpiece is equivalent to the distance from said first pivot axis to said second pivot axis so that said workpiece travels in a linear reciprocal path below said carriage and through said first pivot axis;

a continuous timing belt extending around said center pivot portion of said carriage and extending around said sprocket of said rotatable supporting means for said workpiece holder so that upon said pivot arm rotating, said workpiece holder rotates counter-rotationally to said pivot arm thereby rotating said workpiece 180° relative to said second pivot axis to an inverted position during its full linear length of travel; and a pair of idle rollers housed in said pivot arm and coupled with said timing belt to eliminate undesirable slack in said timing belt.

12. An apparatus as stated in claim 11 wherein said means for supporting said frame comprises an overhead gantry that provides additional linear reciprocal movement of said workpiece by providing additional linear reciprocal movement of said apparatus.

13. An apparatus as stated in claim 11 wherein said workpiece holder comprises a linear drive unit providing additional linear reciprocal movement to said workpiece along said horizontal plane of said workpiece holder.

14. An apparatus as stated in claim 11 wherein said means for limiting vertical movement of said carriage comprise:

an upper horizontal mounting plate connected to the top of said u-shaped portion of said carriage;

a first shock absorber connected to said frame, and said first shock absorber mounted below said upper horizontal mounting plate so that said upper horizontal mounting plate engages said first shock absorber upon said carriage traveling to a lower vertical position wherein said first shock absorber prohibits further downward vertical movement of said carriage; and a second shock absorber connected to said frame and mounted above said lower mounting plate and below said first shock absorber so that said lower mounting plate engages said second shock absorber upon said carriage traveling to an upper vertical position wherein said second shock absorber prohibits further upward vertical movement of said carriage.

* * * * *